United States Patent
Lloyd et al.

(10) Patent No.: US 6,691,231 B1
(45) Date of Patent: Feb. 10, 2004

(54) METHOD AND APPARATUS FOR PROVIDING ACCESS ISOLATION OF REQUESTED SECURITY RELATED INFORMATION FROM A SECURITY RELATED INFORMATION SOURCE

(75) Inventors: James Steven Lloyd, Stittsville (CA); Sharon M. Boeyen, Stittsville (CA); Ronald J. Vandergeest, Kanata (CA)

(73) Assignee: Entrust Technologies Limited, Ottawa (CA)

( * ) Notice: Subject to any disclaimer, the term of this patent is extended or adjusted under 35 U.S.C. 154(b) by 0 days.

(21) Appl. No.: 09/325,650

(22) Filed: Jun. 7, 1999

(51) Int. Cl.[7] .................................................. G06F 1/24
(52) U.S. Cl. ........................ 713/201; 713/200; 713/189; 713/164; 713/165
(58) Field of Search ................................. 713/201, 200, 713/189, 164, 165, 166, 167

(56) References Cited

U.S. PATENT DOCUMENTS 5,606,609 A * 2/1997 Houser et al. ............... 713/179
5,727,145 A * 3/1998 Nessett et al. ............... 713/200
5,862,323 A * 1/1999 Blakley et al. ............... 713/200

OTHER PUBLICATIONS

Innosoft LDAP Proxy Server Administrator's Guide, Innosoft International, Inc., Oct. 1998.

* cited by examiner

Primary Examiner—Thomas R. Peeso
(74) Attorney, Agent, or Firm—Vedder Price Kaufman & Kammholz, P.C.

(57) ABSTRACT

An apparatus and method provides arbitration among a plurality of subscribers and also provides access isolation between a requester, such as a subscriber or other entity, and a security-related information source, such as a repository containing certificates and certificate revocation lists (CRLs) or other security-related information. The system and method isolates the requester from the source by generating separate security information release-data to obtain the security-related information from the source based on analyzed request criteria-data. The arbitration module generates a separate security-information release request to the repository to retrieve appropriate data from the internal repository in response to the externally generated request without allowing the request to filter directly through to the security-related information source.

36 Claims, 4 Drawing Sheets

METHOD AND APPARATUS FOR PROVIDING ACCESS ISOLATION OF REQUESTED SECURITY RELATED INFORMATION FROM A SECURITY RELATED INFORMATION SOURCE

FIELD OF THE INVENTION

The invention relates generally to information security systems and methods and more particularly to information security systems and methods that provide isolation between a requestor and a security information source.

BACKGROUND OF THE INVENTION

Secure computer systems and other systems are known which use cryptographic techniques to encrypt and decrypt data sent from one computer or user to another computer within a network. In typical public key cryptographic systems, digital signature key pairs, such as a signature private key and a verification public key, are used to authenticate a digital signature of a client to ensure that a message sent by client actually came from the client sending the message and has not been altered. Generally, data is digitally signed by a sender using the signature private key and authenticated by a recipient using the verification public key. In addition to digital signature key pairs, encryption key pairs are also generally used to encrypt the data being sent from one client to another client. An encryption key pair includes a decryption private key and an encryption public key. Data is encrypted using the encryption public key and decrypted by a recipient using the decryption private key. Certificates are generated by a manager or trusted certification authority for the public keys of the private/public key pair to certify that the keys are authentic and valid.

Certificates and certificate revocation lists (CRLs) should be freely disseminated in order to facilitate the secure exchange of e-mail as well as other global applications, such as electronic commerce. However, there is increasing concern shared by many enterprise domainsthat uncontrolled dissemination of certificates and CRLs will introduce potential vulnerabilities. When possible, vulnerability may be introduced as a result of outsiders obtaining access to sensitive databases or repositories where the certificates and CRLs are stored, such as X.500 directories, or other public key infrastructure (PKI) repositories, as known in the art, within the corporate network system. This has led to an unwillingness among a number of organizations to share their corporate database information. Generally, there is also an unwillingness to replicate or copy certificates and CRLs to external repositories because of the operational overhead with doing so and the difficulty in insuring that the replicated information does not become obsolete or become trusted when it should not be.

One known technique for isolating an information requester or subscriber within a networked community, is the use of a firewall server or computer. In such well-known systems, the requester is granted access to a target resource within a secure system after passing through the firewall computer. As such, the requester is typically granted direct access to the target resource. Access is typically granted based on access control information sent in an initial access request. However, such firewall-based systems still can expose highly sensitive corporate information to an outsider if the outsider is allowed to pass through the firewall, and have end-to-end access to an internal system.

Also, light weight directory access protocol (LDAP) proxy servers are known, that are used with firewalls as secondary special purpose firewalls. These special purpose firewalls are typically used to filter LDAP requests and allow accepted LDAP requests to be passed to the target LDAP server thereby allowing a client direct access to the server. Again, such firewall-based systems still can expose highly sensitive corporate information to an outsider if the outsider is allowed to pass through the firewall, and have end-to-end access to an internal system.

Other information-security systems, such as those that employ public key cryptography, have certification authorities that post certificates to a repository and a subscriber that obtains the signed certificates directly from the repository. Such systems typically also allow end-to-end access of the subscriber to the repository and typically require the same protocol to be used between a subscriber and the repository.

Accordingly, there exists a need for a system and method to allow the scaleable dissemination of the requisite security-related information, such as certificates, CRLs, and other security information, without introducing such potential security concerns relating to access to valuable corporate resources, or requiring unacceptable operational overhead.

BRIEF DESCRIPTION OF THE DRAWINGS

The invention will be more fully understood in view of the below description in conjunction with the accompanying drawings.

DETAILED DESCRIPTION OF THE PREFERRED EMBODIMENTS

Briefly, an apparatus and method provides arbitration among a plurality of requesters and also provides access isolation between a requester, such as a subscriber or other entity, and a security-related information source, such as a repository containing certificates and CRLs or other security-related information. The system and method isolates the requester from the source by generating separate security information release-data to obtain the security-related information from the source based on analyzed request criteria-data. As such, in one embodiment, an arbitration module is set up between a networked infrastructure, such as a corporate infrastructure and external-end users. The arbitration module receives requests from external users for security information and determines whether or not the request should be satisfied. The arbitration module generates a separate security-information release request, consisting of separate security release data, to the repository to retrieve appropriate data from the internal repository in response to the externally generated request without allowing that request to filter directly to the internal repository.

In one embodiment, pre-processing is done prior to responding to the request, such as checking revocation status of a signed request prior to supplying a certificate. The request criteria data used by the arbiter includes, for example, the type of data to obtain from the security-related information source, a priori knowledge of the target end-user's e-mail address, source domain name, source certification authority in the event that certificate-based authentication is used, source IP address data, or portion thereof, privilege or permission information of the source, or any other set of suitable criteria.

Differing protocols may be used between the requester and arbiter and between the arbiter and the information source. For example, connectivity between the external end-user and the arbiter can be facilitated through connectionless, connection-oriented, session connection or store-and-forward techniques, for example, HTTP, Lightweight Directory Access Protocol (LDAP), File Transfer Protocol (FTP), e-mail and any other suitable protocol. Likewise, back-end connectivity between arbiter and the repository can be any suitable protocol.

Figure 1:
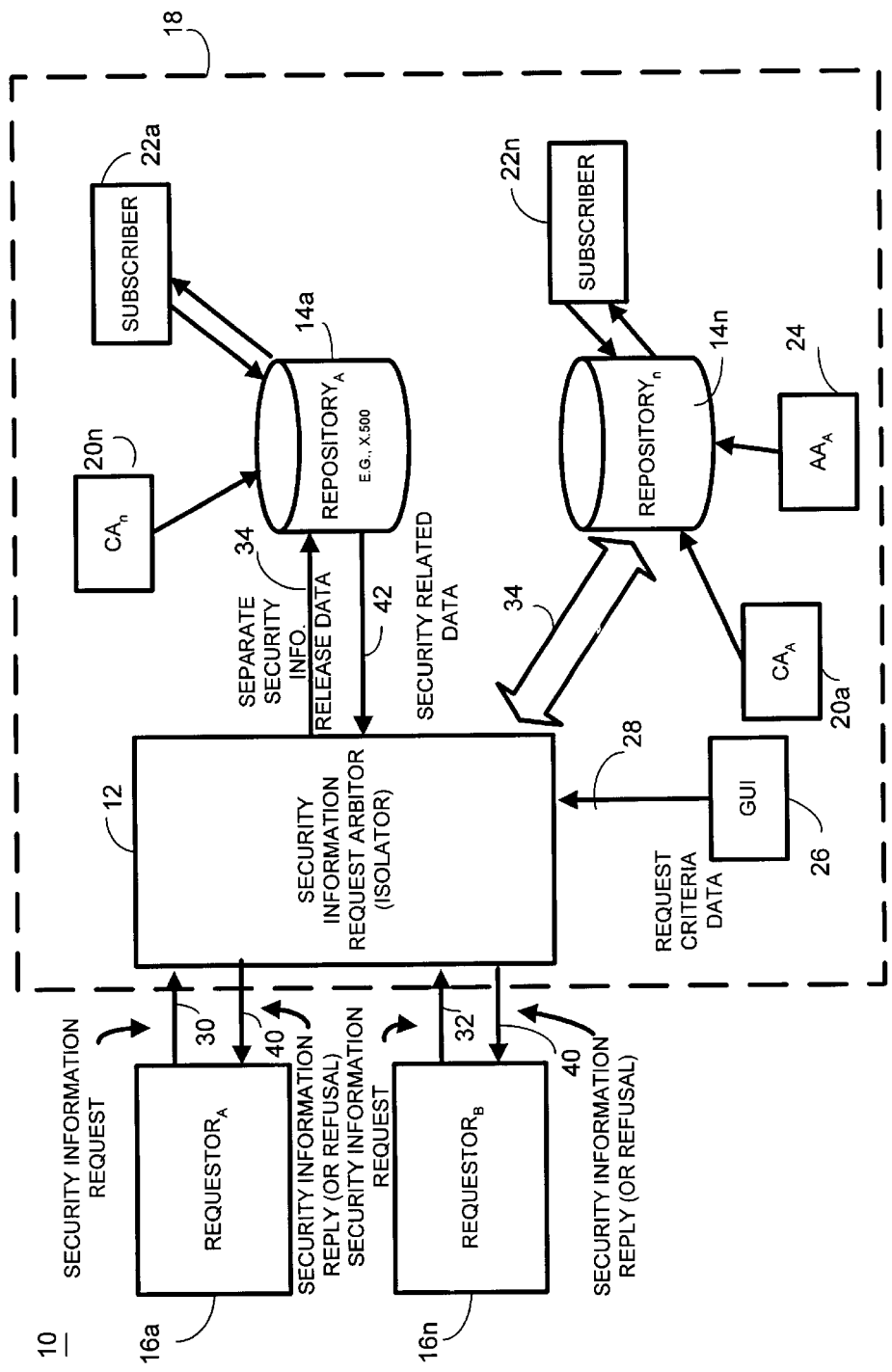
FIG. 1 is block diagram illustrating one embodiment of a system employing an apparatus for providing isolation access of requested security-related information from a security-related information source in accordance with one embodiment of the invention.

FIG. 1 shows a system 10 employing a security-information request arbiter 12 to provide isolation of access requests between security-related information from a security-related information source 14a–14n and one or more requesters 16a–6n. The security-information request arbiter 12 and security-related information sources 14a–14n may be, for example, part of a corporate infrastructure 18. However, it will be recognized that the security-related information sources 14a–14n may be outside of the corporate infrastructure desired. The security-information request arbiter 12 may be a suitably programmed computer, such as an IBM-compatible PC, or any suitable processing device. The requester 16a–16n may also be any suitable processing unit, software application, or any other suitable entity requesting access of security information from a security-related information source. Security information may include, for example, cryptography-related security data such as public key certificates, CRLs, passwords, cryptographic algorithms, and non-cryptographic information used in some way to secure information stored in the information source 14a–14n.

The repository 14a–14n may be any suitable storage medium and may also be, for example, certificate repositories such as an X.500-based repository, database, or file system. As known in the art of public key cryptography, for example, the repository may be accessible by a plurality of other servers such as certification authorities 20a–20n, which generate signed public key-based certificates for requesters or other subscribers to the system. Other subscribers are shown as subscribers 22a–22n, which may be included in the corporate infrastructure, or may also be outside of the corporate infrastructure but also have access to the repositories. Other information security-related services such as attribute authorities 24 may also have access to the respective repositories if desired. Attribute authorities, as known in the art, issue and revoke attribute certificates rather than public key certificates. These certificates and associated revocation lists are managed similarly to public key certificates and revocation lists.

The security-information request arbiter 12 may include or be coupled to a graphic user interface 26 to receive or otherwise obtain request-criteria data 28. Request criteria-data 28 may include, for example, a list of approved requesters and the type of data obtainable from a repository for a given requester. As such, the request criteria-data may include approved requester identification data such as a requester number, data representing releasable security-related information from the source such as releaseable public key certificates, CRLs and conditional criteria-data to facilitate the release of security-related information from the source, such as conditions that must first be met before releasing the data. One example of a condition may be that a confirmation request from another requester must first be received, or other suitable conditional criteria-data. It will be recognized that any suitable request criteria may also be used if desired.

The security-information request arbiter 12 also arbitrates among a plurality of received security-information requests based on the security-criteria data 28. For example, if a plurality of requests are received, the security-criteria data may indicate that a request from a given requester takes priority over the request of another requester and hence arbitrates among the requests that are received.

Each requester 16a–16n generates a security information request 30 and 32, representing a request for the security-related information from at least one of the sources 14a–14n. The security information request may be communicated to the security information request arbiter 12, using any suitable protocol. As shown, the security information request data 30 from requester A 16a may be in a different format from that of the security information request data 32 received from requester B 16n. The security information request arbiter 12 isolates a respective requester 16a–16n from the respective security-related information source 14a–14n by generating separate security information release data 34, to obtain the security information from the source. Release is granted based on analyzed request criteria data 28 for a given requester. For example, if the request-criteria data is a list of approved requesters and the requester 16a is not on the list, the separate security information release-data 34 will not be sent to the repository. Instead, a security-information reply 40, indicating a refusal, will be returned to the requester. However, if the security information request includes a request for identification data that satisfies the request criteria, the security-information reply data 40 will include the requested security information from the relevant repository.

In an alternative embodiment, the security-information request arbiter generates the reply data based on a response from the source to the separate security-information release data which is always sent in response to a security-information request.

The separate security-information release data is evaluated by the repository. The repository then returns stored security-related data 42 back to the security-information request arbiter who then passes the security-related data as part of the security information reply 40 back to the suitable requester.

Figure 2:
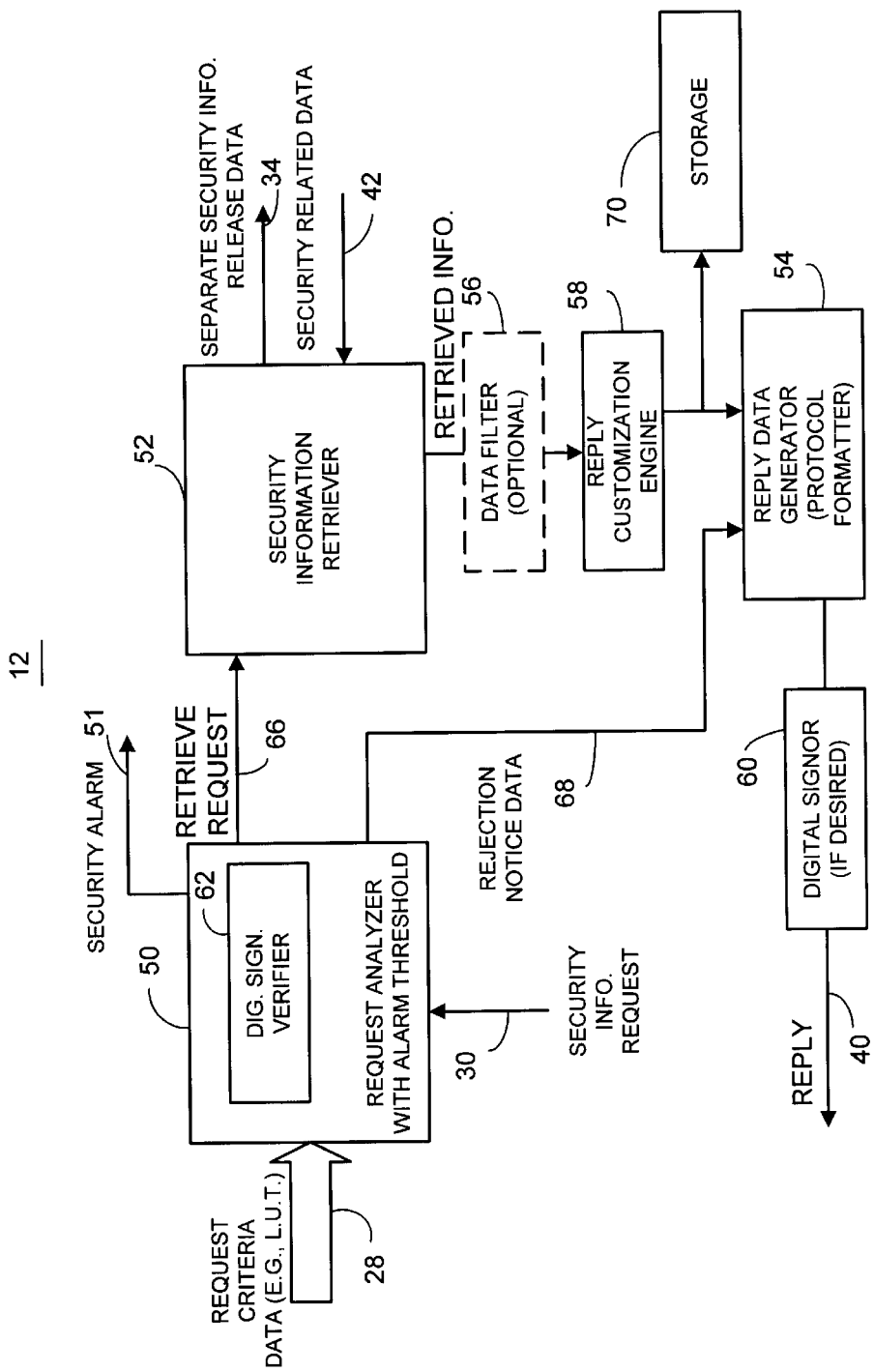
FIG. 2 is a block diagram illustrating one example of a request arbiter in accordance with one embodiment of the invention.
Figure 3A:
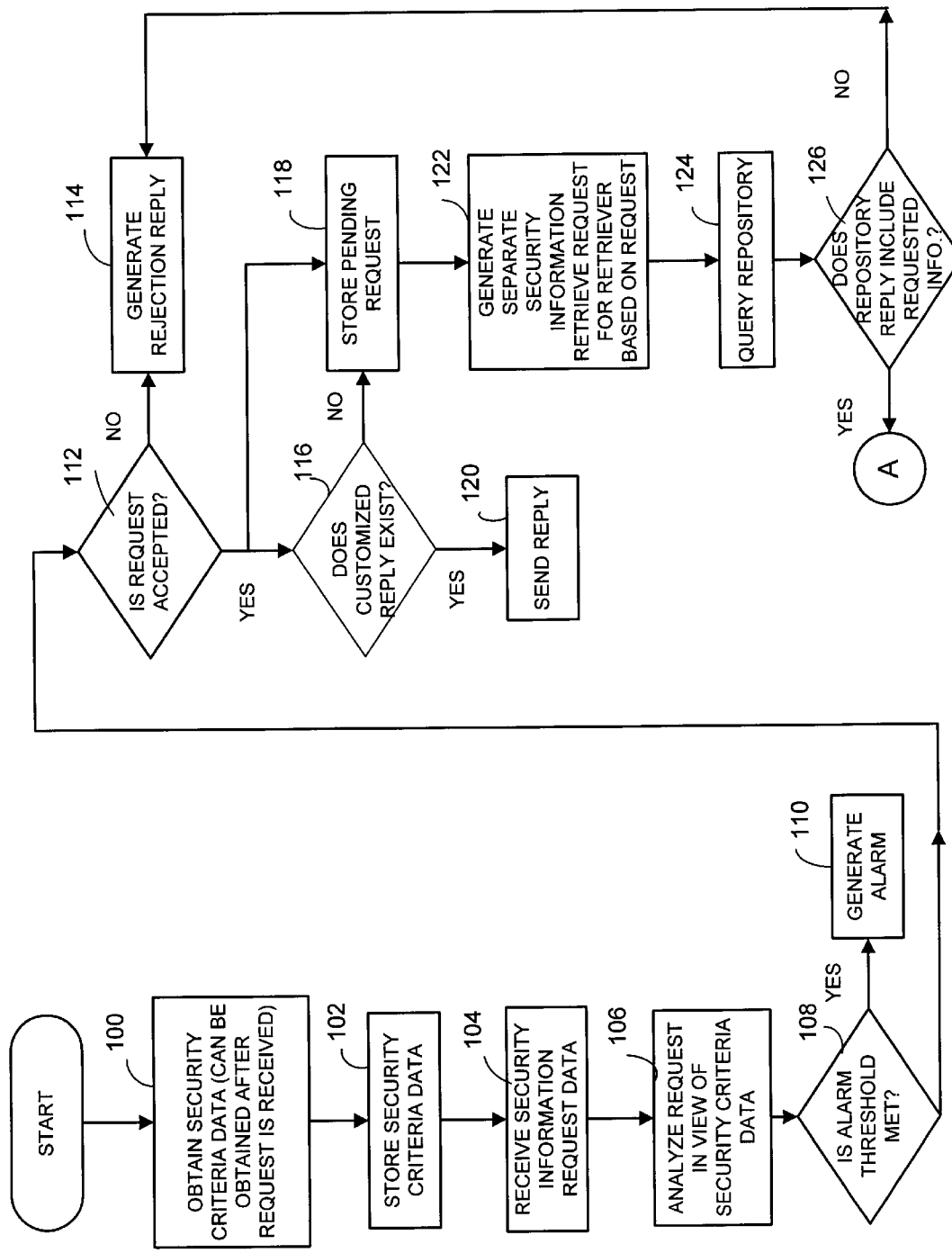
FIGS. 3a and 3b is a flow chart illustrating the operation of the system shown in FIG. 1.
Figure 3B:
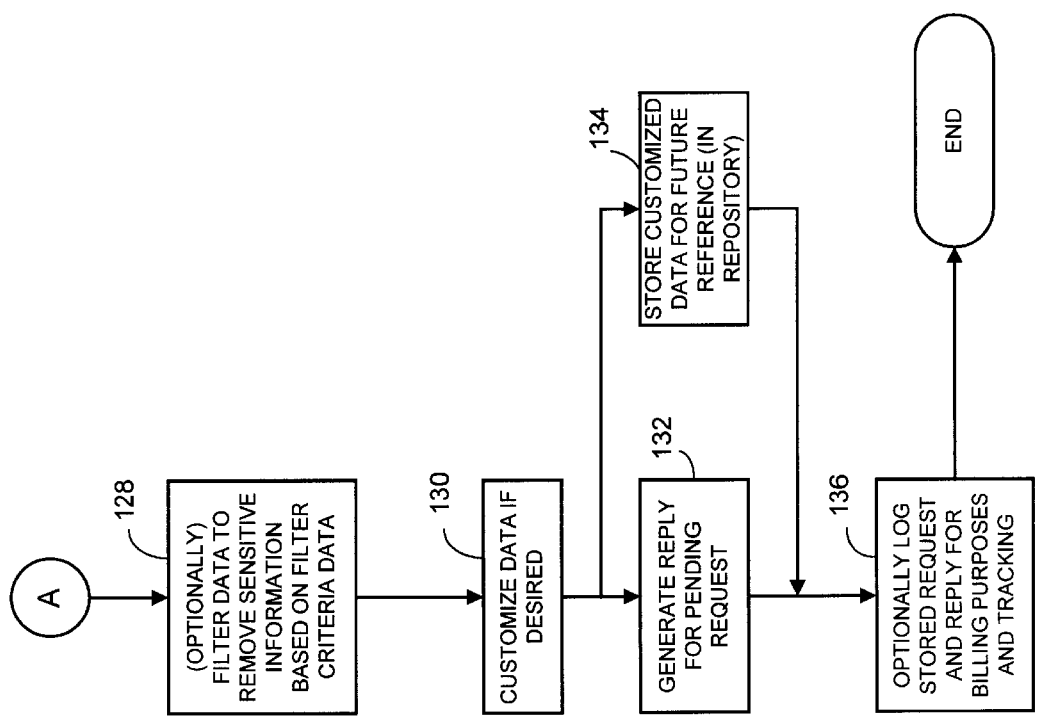

Referring to the FIGS. 2, 3a, and 3b, one example of the security-information request arbiter 12 includes a request analyzer 50, a security-information retriever 52, and a reply generator 54. If desired, a data filter 56, a reply customization engine 58 and a digital signing engine 60 may also be used.

The request analyzer 50 determines, based on the request-criteria data 28, whether to allow a security-information request and the type of data to obtain from the security-related information source. The request-criteria data may be, for example, a look-up table, having a column listing of the allowable requesters for which the request analyzer will approve or allow security information to be obtained from the source, as well as another column indicating the type of data for that specific requester or group of requesters that can be obtained. For example, certain requesters may be limited to retrieving only certificate information, whereas other requesters having higher security clearance may be allowed to obtain security information for other purposes. The request analyzer 50 may obtain the request-criteria data 28 from lookup tables stored in cache memory or other suitable locations. In addition, if desired, the request analyzer 50 may also include an alarm threshold or series of alarm thresholds that when triggered, generate a security alarm signal 51 to a display device or a log table, indicating that a particular requester has breached security by requesting information not allowed, or indicated as approved for, by the request-criteria data. As such, the security-information request arbiter may notify a security officer of a potential breach in security.

Where the security-information request data 30 includes a public key-based certificate or other certificate having a digital signature, the request analyzer 50 may also include a digital signature verifier 62, operative to verify digital signatures associated with the security information-request data. Any suitable digital signature verifying algorithm may be used, such as RSA, DSA, or elliptic curve algorithms. In such a system, if desired, the arbiter 12 may also include a digital signing engine 60, which applies a digital signature of the arbiter to the selected security-related data from the source, namely the retrieved information (security-related data 42), resulting in the reply data 40. The digital signature generates a verifiable digital signature for the reply data 40. Again, any suitable digital signing algorithm may be used, such as RSA, DSA, or elliptic curve algorithms.

In this embodiment, the security-information request analyzer 50 receives the security information request data 30 in a first protocol such as an HTTP-based format and generates the separate security information release data 34 in a second protocol such as FTP, suitable for obtaining selected security-related information from the source. This may be done, for example, by the request analyzer generating retrieve/request data 66 after a digital signature corresponding to the requester as part of the security-information request data 30 has been verified and once the request criteria data 28 indicates that a separate security information release data should be generated. If the digital signature does not verify, or if the request criteria data indicates that this requester cannot obtain the requested security-information, the rejection-notice data 68 is then sent to the reply generator 54. The reply-data generator 54 may be a protocol formatter which puts the rejection notice or selected retrieved information from the repository in a suitable protocol format for proper understanding by the requester.

The reply data 40 for the requester includes retrieved security-related data obtained from the source in response to the separate security information release data 34. Optionally, the system may include the data filter 56, which is operatively coupled to filter retrieved security-related data obtained from the source in response to the separate security-information release data. The filtering is done based on filter-criteria data. For example, the filter-criteria data (which is entered through the graphic user interface or other mechanism) may include data that should be filtered for a given requestor or for a certain type of request. Filtering includes removing or modifying data prior to communicating the reply data for the requester. Modifying data includes adding to or altering the data, for example encrypting it. As such, the data filter 56 analyzes the retrieved information from the repository and compares it to the rest of the types of data that require filtering, and if the type of data appears on the list, the data may be modified, or removed so that superfluous information is not sent to a requester.

As an additional option, the arbiter 12 may include a data customizer or customization engine 58 that is coupled to customize the retrieved security-related data obtained from the source in response to the separate security-information release data by at least adding additional data to the retrieved security-related data. The additional data may include, for example, contact information, source site identification data, or corporate branding information. The arbiter may also include or have access to memory 70 which may contain stored customized retrieve security-related data for later use in response to subsequently received security-information request data so that the data does not need to be again obtained from the repository, such as certificates, CRLs or other data. The storage device 70 may also contain pending security information-request data that is yet to be processed and associated reply data to facilitate tracking of request data and corresponding reply data to facilitate, for example, billing to requesters who are requesting information on a periodic basis.

Referring to FIGS. 3a and 3b, the system obtains security-criteria data as shown in block 100. This information can be obtained, for example, prior to a request being received or after a request is received if desired, and may be obtained, for example, from any suitable memory. As shown in block 102, the system stores the security-criteria data for later evaluation. This information may be stored, for example, in the form of a look-up table or in any suitable form. As shown in block 104, the arbiter then receives the security information requested through a suitable transceiver such as a modem, RF link, or any other suitable communication link and in any suitable format. As shown in block 106, the arbiter analyzes the request in view of the security-criteria data by comparing the information in the request with the request criteria data. For example, the security criteria data may specify that incoming security information request data must include a digital signature by the requestor, so that the requestor may be authenticated to the arbiter. As another example, the security criteria data may specify that incoming security information request data must include billing information sufficient to appropriately bill the requestor for the value of the information requested.

As shown in block 108, the arbiter determines if the security alarm threshold has been met. If the security alarm threshold has been met, an alarm is generated as shown in block 110. This may occur, for example, if a same requester has requested information that is not listed in the request-criteria data for that specific requester for a predetermined number of times. As shown in block 112, the system determines if the request has been accepted, meaning that the request-criteria data matches the data within the security-information request. If the request has not been accepted, the system generates a rejection reply, as shown in block 114. However, if the request has been accepted, the system determines, as shown in block 116, whether a customized reply exists in the memory 70. This may occur, for example, if a previous request and reply was generated and the reply was cached and the same request has been requested within an allowable time frame. If the customized reply does not exist, the system stores the pending request in memory, as shown in block 118. As shown in block 120, if a customized reply does exist for the particular security-information request, the system sends a reply obtained from memory 70, as shown in block 120.

As shown in block 122, after the pending request has been stored, the system generates the separate security information request. As shown in block 124, the arbiter then sends the separate security-information release data 34 to query the repository. As shown in block 126, the arbiter through the security-information retriever, determines the content security related data 42 to determine whether the repository reply includes the requested information. If the repository does not include the requested information, a rejection reply is generated. However, if the repository reply does include the requested information, the system, as shown in block 128, filters the data to remove or modify sensitive information based on the filter-criteria data.

As shown in block 130, the system customizes the retrieved security-related data obtained from the source in response to the separate security-information release data by adding additional data to the retrieved security-related data. The additional data may include, for example, contact information, source site identification data, or corporate branding information.

As shown in block in block 132, the system generates the reply for the pending request, which may include a digitally signed reply and also store the customized data for future reference in the repository or in cache memory if desired, as shown in block 134. As shown in block 136, the system may optionally log or store the request and the generated reply for a given requester for billing purposes and tracking purposes to facilitate an accountability of, and record of, obtained information from the repository. Where the security information request is digitally signed and where the reply is digitally signed, the system may operate by validating data associated with the security information request data, such as the signature, and generating validatable reply data, such as the signed reply, using at least one of: digital signatures, timestamps, revocation information, policy data, checksums or any other suitable validatable data.

As such, the above-described system provides arbitration with access isolation to isolate a requester from the security-information source so that the requester cannot directly access or otherwise obtain access to the sensitive information in the repository. Moreover, the system allows communication in different protocols between a requester and the arbiter and the arbiter and the repository, and as such can flexibly handle communication with many different types of requesters. Where a reply is digitally signed, the system affords a trusted verification that the information was obtained not only from a trusted repository but by a trusted arbiter.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for providing requested security related information from a security related information source comprising the steps of:

receiving, from a requestor, security information request data representing a request for the security related information from the source;

isolating the requestor from the source by generating separate security information release data, to obtain the security related information from the source based on analyzed request criteria data; and generating reply data for the requestor based on a response to the separate security information release data.

2. The method of claim 1 including the step of arbitrating among a plurality of received security information requests based on the request criteria data.

3. The method of claim 2 wherein the step of arbitrating includes determining, based on the request criteria data, allowance of a security information request and a type of data to obtain from the security related information source.

4. The method of claim 1 wherein the step of receiving includes receiving the security information request data in a first protocol based format and wherein the step of generating the separate security information release data includes generating the separate security information release data in a second protocol suitable for obtaining selected security related information from the source.

5. The method of claim 1 wherein the response to the separate security information release data includes selected security related data from the source.

6. The method of claim 1 including the step of obtaining the request criteria data and wherein the request criteria data includes at least one of: approved requestor identification data, data representing releasable security related information from the source and conditional criteria data to facilitate the release of security related information from the source.

7. The method of claim 1 wherein the reply data for the requester includes retrieved security related data obtained from the source in response to the separate security information release data.

8. The method of claim 1 including the step of filtering retrieved security related data obtained from the source in response to the separate security information release data based on filter criteria data.

9. The method of claim 8 wherein the filter criteria data includes data representing sensitive data that should be filtered prior to communicating the reply data for the requestor.

10. The method of claim 1 including the step of customizing retrieved security related data obtained from the source in response to the separate security information release data by at least adding additional data to the retrieved security related data.

11. The method of claim 10 including the step of storing customized retrieved security related data for later use in response to subsequently received security information request data.

12. The method of claim 1 including the steps of validating data associated with the security information request data and generating validatable reply data, where validation of the validatable reply data includes use of at least one of: digital signatures, timestamps, revocation information, policy data, and checksums.

13. The method of claim 1 including the step of storing pending security information request data and associated reply data to facilitate tracking of request data and corresponding reply data.

14. A method for providing requested security related information from a security related information source comprising the steps of:

receiving, from a requester, security information request data representing a request for the security related information from the source;

arbitrating among a plurality of received security information requests based on request criteria data;

obtaining the request criteria data and wherein the request criteria data includes at least one of: approved requestor identification data, data representing releasable security related information from the source and conditional criteria data to facilitate the release of security related information from the source;

isolating the requestor from the source by generating separate security information release data, to obtain the security related information from the source based on analyzed request criteria data or security information release data; and generating reply data for the requester based on a response to the separate security information release data wherein the reply data for the requestor includes retrieved security related data obtained from the source in response to the separate security information release data.

15. The method of claim 14 wherein the step of arbitrating includes determining, based on the request criteria data, allowance of a security information request and a type of data to obtain from the security related information source.

16. The method of claim 15 wherein the step of receiving includes receiving the security information request data in a first protocol based format and wherein the step of generating the separate security information release data includes generating the separate security information release data in a second protocol suitable for obtaining selected security related information from the source.

17. The method of claim 15 wherein the response to the separate security information release data includes selected security related data from the source.

18. The method of claim 15 including the step of filtering retrieved security related data obtained from the source in response to the separate security information release data based on filter criteria data.

19. The method of claim 18 wherein the filter criteria data includes data representing sensitive data that should be filtered prior to communicating the reply data for the requestor.

20. The method of claim 19 including the step of customizing retrieved security related data obtained from the source in response to the separate security information release data by at least adding additional data to the retrieved security related data.

21. The method of claim 20 including the step of storing customized retrieved security related data for later use in response to subsequently received security information request data.

22. The method of claim 21 including the steps of validating data associated with the security information request data and generating validatable reply data, where validation of the validatable reply data includes use of at least one of: digital signatures, timestamps, revocation information, policy data, and checksums.

23. The method of claim 22 including the step of storing pending security information request data and associated reply data to facilitate tracking of request data and corresponding reply data.

24. An apparatus for providing requested security related information from a security related information source comprising:

a security information request analyzer that receives, from a requestor, security information request data representing a request for the security related information from the source and isolates the requestor from the source by generating separate security information release data, to obtain the security related information from the source based on analyzed request criteria data; and a reply data generator, operatively coupled to the security information request analyzer, that generates reply data for the requestor based on a response from the source to the separate security information release data.

25. The apparatus of claim 24 including an arbitor operative to arbitrate among a plurality of received security information requests based on the request criteria data.

26. The apparatus of claim 25 wherein the arbitor determines, based on the request criteria data, allowance of a security information request and a type of data to obtain from the security related information source.

27. The apparatus of claim 24 wherein the security information request analyzer receives the security information request data in a first protocol based format and generates the separate security information release data in a second protocol suitable for obtaining selected security related information from the source.

28. The apparatus of claim 24 wherein the response to the separate security information release data includes selected security related data from the source.

29. The apparatus of claim 24 where in the security information request analyzer obtains the request criteria data and wherein the request criteria data includes at least one of: approved requestor identification data, data representing releasable security related information from the source and conditional criteria data to facilitate the release of security related information from the source.

30. The apparatus of claim 24 wherein the reply data for the requester includes retrieved security related data obtained from the source in response to the separate security information release data.

31. The apparatus of claim 24 including an information filter operatively coupled to filter retrieved security related data obtained from the source in response to the separate security information release data based on filter criteria data.

32. The apparatus of claim 31 wherein the filter criteria data includes data representing sensitive data that should be filtered prior to communicating the reply data for the requestor.

33. The apparatus of claim 24 including a data customizer operatively coupled to customize retrieved security related data obtained from the source in response to the separate security information release data by at least adding additional data to the retrieved security related data.

34. The apparatus of claim 33 including a storage device containing customized retrieved security related data for later use in response to subsequently received security information request data.

35. The apparatus of claim 24 including a digital signature verifier operative to verify a digital signature associated with the security information request data and generating a verifiable digital signature for the reply data.

36. The apparatus of claim 24 including a storage device containing pending security information request data and associated reply data to facilitate tracking of request data and corresponding reply data.

* * * * *